United States Patent
Huang

(10) Patent No.: US 9,781,520 B1
(45) Date of Patent: Oct. 3, 2017

(54) PASSIVE MODE CARBON NANOTUBE UNDERWATER ACOUSTIC TRANSDUCER

(71) Applicant: Dehua Huang, Newport, RI (US)

(72) Inventor: Dehua Huang, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/270,166

(22) Filed: Sep. 20, 2016

(51) Int. Cl.
| H04R 23/00 | (2006.01) |
| H04R 1/44 | (2006.01) |
| B82Y 15/00 | (2011.01) |

(52) U.S. Cl.
CPC ............ *H04R 23/002* (2013.01); *H04R 1/44* (2013.01); *B82Y 15/00* (2013.01)

(58) Field of Classification Search
CPC ........ H04R 1/44; H04R 23/002; G01K 11/22; B82Y 15/00
See application file for complete search history.

(56) References Cited

U.S. PATENT DOCUMENTS

| 7,093,343 | B2 | 8/2006 | Osborn |
| 7,427,201 | B2 | 9/2008 | Meisner |
| 8,199,938 | B2 | 6/2012 | Jiang et al. |
| 8,494,187 | B2 | 7/2013 | Jiang et al. |
| 8,537,640 | B2 | 9/2013 | Jiang et al. |
| 8,553,912 | B2 | 10/2013 | Wang et al. |
| 8,760,973 | B1 | 6/2014 | Chamblee et al. |
| 8,811,631 | B2 | 8/2014 | Liu |
| 8,958,579 | B2 | 2/2015 | Jiang et al. |
| 9,061,906 | B2 | 6/2015 | Wei et al. |
| 9,217,084 | B2 | 12/2015 | Schaedler et al. |
| 2014/0105242 | A1* | 4/2014 | Fernandes ............... G01J 5/046 374/45 |
| 2016/0037267 | A1* | 2/2016 | Aliev .................... H04R 23/002 381/164 |
| 2016/0157022 | A1* | 6/2016 | Zhou ..................... H04R 19/02 381/191 |

OTHER PUBLICATIONS

Karimov et al. "Carbon nanotubes film based temperature sensors." Physica E: Low-dimensional Systems and Nanostructures. vol. 43. Issue 9 (2011): pp. 1701-1703.*

* cited by examiner

*Primary Examiner* — Joshua Kaufman
(74) *Attorney, Agent, or Firm* — James M. Kasischke; Michael P. Stanley

(57) ABSTRACT

A passive carbon nanotube transducer is provided. The passive carbon nanotube transducer includes shells as protective walls for the top and bottom housing of the transducer with carbon nanotube sheets affixed between the shells. The shells act as acoustic windows that match the surrounding acoustic medium. A gasket encloses the shells and carbon nanotube sheets of the transducer. Each carbon nanotube sheet has an electrode at both ends. Multiple carbon nanotube sheets are capable of sensing sound induced environment temperature deviations and converting electric voltage or current for passive acoustic detection.

1 Claim, 1 Drawing Sheet

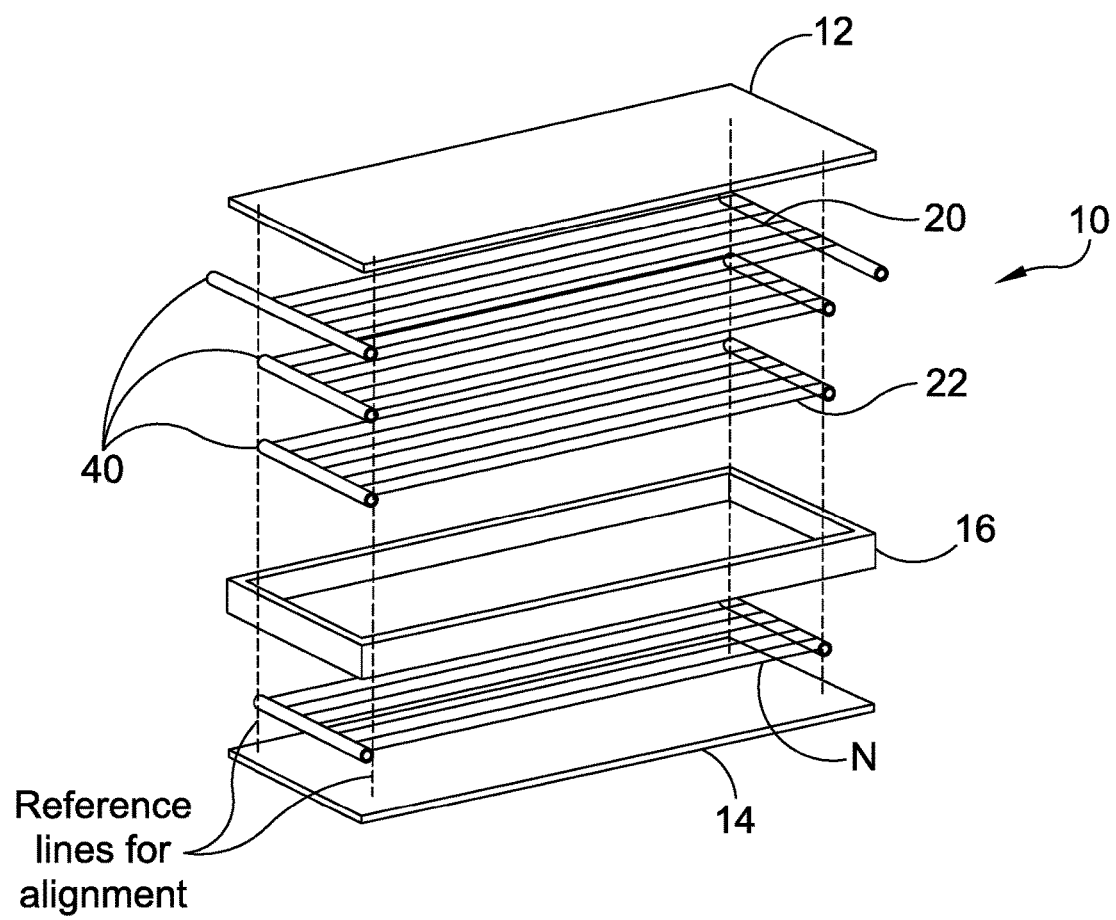

PASSIVE MODE CARBON NANOTUBE UNDERWATER ACOUSTIC TRANSDUCER

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

The present application relates to application Ser. No. 15/273,817; filed 23 Sep. 2016, entitled "A CARBON NANOTUBE UNDERWATER ACOUSTIC THERMOPHONE" and application Ser. No. 15/273,801; filed 23 Sep. 2016, "entitled "UNDERWATER ACOUSTIC CARBON NANOTUBE THERMOPHONE".

BACKGROUND OF THE INVENTION (1) Field of the Invention

The present invention is an acoustically transparent carbon nanotube transducer that can operate in a passive acoustic mode for data collection.

(2) Description of the Prior Art

The principle of thermal active acoustic transduction is that when alternating current is passed through a comparatively thin transducer; periodic heating takes place in the conductor following variations in power strength from an outside source. This periodic heating produces temperature waves which propagate into the surrounding medium. The amplitude of the temperature wave decreases rapidly as the distance from the conductor increases. Based on the rapid production of these temperature waves; the net effect is to produce a periodic rise in temperature in a limited portion of the medium near the conductor. Thermal expansion and contraction of this layer of the medium determines the amplitude of the resulting sound waves.

Recently, there has been development of underwater acoustic carbon nanotube (CNT) yarn sheets capable of producing high acoustic output at low frequencies with broad bandwidth. An underwater acoustic transmitter is feasible in which the transmitter uses thermal means of heated CNT substrates and in which a low frequency acoustic projector is formed. The acoustic carbon nanotubes can act as acoustic transducers while having a comparatively small volumetric size. The principle transduction for active acoustic carbon nanotubes is through thermal acoustics as opposed to conventional underwater transducers that utilize electromechanical vibrations.

In Osborn (U.S. Pat. No. 7,093,343), acoustic projectors are disclosed that generate seismic energy in marine geophysical testing. The acoustic projectors use energy comprising a pressure pulse that travels through the water and underlying subsurface geologic structures. The energy is partially reflected from interfaces between the geologic structure and is detected with geophone or hydrophone sensors. The cited reference includes five transducers but any number of transducers can be included.

Meisner (U.S. Pat. No. 7,427,201) discloses a current intersection point of carbon nanotubes that emit electrons which, in the vacuum space, excite and cause phosphor to emit light for display purposes. Active material includes a film of any active material or combination of active materials such as quartz, barium titanate, lead niobate, lead zirconate titanate, or piezo active plastic films such as KYNAR. These piezoelectric materials respond to external stimulus, such as sound waves which liberate localized electrons at the various junctions to create amplitude gains. Acoustical transducer arrays can reflect a sound signal in reverse to the sender which can be used for echo location devices.

In Jiang (U.S. Pat. No. 8,199,938), a method is disclosed for producing sound waves. The signal can be applied to the carbon nanotube structure by at least two electrodes from a signal device. When the signals are applied to the carbon nanotube structure; heating is produced in the structure according to variations of the signals. The carbon nanotube structure transfers heat to a medium in response to the signal and the heating of the medium causes thermal expansion of the medium. It is the cycle of relative heating which results in sound wave generation.

In Jiang (U.S. Pat. No. 8,494,187) a sound wave generator is disclosed which includes a carbon nanotube structure and an insulating reinforcement structure in which both constitute a free-standing structure. When holding a point of the carbon nanotube structure, the entire structure can be lifted without being destroyed. The carbon nanotube structure includes a plurality of carbon nanotubes joined by a van der Waals attractive force therebetween.

In Jiang (U.S. Pat. No. 8,537,640), a carbon nanotube film structure of an acoustic element includes at least two stacked carbon nanotube films. In other embodiments, the carbon nanotube structure can include two or more coplanar carbon nanotube films and can include layers of carbon nanotube films. Additionally, when the carbon nanotubes in the carbon nanotube film are aligned along one preferred orientation; an angle can exist between the orientations of carbon nanotubes in adjacent films, whether stacked or adjacent.

Wang (U.S. Pat. No. 8,553,912) discloses a sound wave generator that includes a carbon nanotube structure. The structure can include a plurality of carbon nanotubes uniformly distributed therein. The carbon nanotubes can be combined by a van der Waals attractive force therebetween. The carbon nanotubes in the structure can be selected from single-walled, double-walled or multi-walled carbon nanotubes. There may be many layers of ordered and/or disordered carbon nanotube films in the structure.

Liu (U.S. Pat. No. 8,811,631) discloses a thermo-acoustic device that includes an electrode layer and a sound wave generator. The sound wave generator is disposed on a surface of the electrode layer. The electrode layer includes a plurality of insulated wires and a plurality of conductive wires that are weaved together to form a net structure and an electrode layer as an intertexture. The sound generator includes a carbon nanotube structure with a plurality of nanotubes oriented in the same direction.

Jiang et. al (U.S. Pat. No. 8,958,579) discloses a signal input device that can be a light source for generating light signals. The light signals can be directly transferred to the sound wave generator and a thermos-acoustic device works under a photo-acoustic effect. The photo-acoustic effect is a kind of thermo-acoustic effect and a conversion between light and acoustic signals due to absorption and localized thermal excitation. When rapid pulses of light are incident on a sample of matter; the light can be absorbed and the resulting energy will then radiate as heat. The heat causes detectable sound signals due to pressure variation in the surrounding medium. The thermo-acoustic device includes a signal input device, a sound wave generator and a substrate in a composite carbon nanotube structure.

Wei et. al (U.S. Pat. No. 9,061,906) discloses that films in a carbon nanotube structure can be co-planar or stacked. The number of layers of the carbon nanotube films is not limited. However, as the stacked number of the carbon nanotube films increases; the specific surface area of the carbon nanotube structure will decrease. Stacking the carbon nanotube films adds to the structural integrity of the carbon nanotube structure.

Schaedler et. al. (U.S. Pat. No. 9,217,084) discloses embodiments that include allowing fluids to be included in the region containing the aligned CNT layer with a bias force that optionally may be included perpendicular to the plane of the CNT array. The bias increases the compression of the CNT material and allows for more displacement parallel to the array.

Aliev et. al. (United States Patent Publication No. 2016/0037267) discloses a typical structure of an encapsulated active thermos-acoustic effect device. The device has two conductive electrodes attached to opposite edges of a vibrating plate thru the elastic silicon rubber. The thin carbon nanotube sheet (or a plurality of sheets superimposed on each other) suspended between two plates is connected to electrodes. The interior of the thereby assembled encapsulated device is filled with inert gas.

The optionally multilayered carbon nanotube sheet strips are superimposed on each other under a small angle to the nanotube alignment direction to enhance electrical conductivity in the perpendicular direction. A suspended part of a carbon nanotube sheet will create a temperature gradient that alternates at a sound frequency.

In the above active acoustic transductions; the electric power (of voltage squared over impedance, not the voltage itself) is proportional to temperature deviation. The temperature is directly proportional to a pressure disturbance wave. That is, if the driving voltage is at a frequency of ω, the electric power will be at a frequency of 2ω. The frequencies from temperature deviation and acoustic waves are both at 2ω as well.

Here, the energy flow is from electric to Joule heat, which is an irreversible process in that a reciprocal thermo-acoustic process becomes impossible by any active thermo-acoustic device. This process is similar to the energy transformation from electrical to light (with irreversible Joule heat) by an electric light bulb. The reciprocal (or reverse) of this process by supplying heat and shining light to the same electric bulb in order to generate electrical energy back is impossible, simply because Joule heat is involved.

Based on the cited references and the Joules heat effect by known active carbon nanotube transducers; there is a need for an alternate use of carbon nanotube transducers. As such, there is a use for a carbon nanotube transducer to operate in a passive mode. The inventive passive transducer could then be used as an underwater acoustic transduction hydrophone.

SUMMARY OF THE INVENTION

It is therefore a primary object and general purpose of the present invention to provide a passive acoustic carbon nanotube transducer.

It is a further object of the present invention to provide a passive acoustic transducer that can operate as an underwater acoustic hydrophone.

In order to attain the objects of the invention, a passive mode carbon nanotube transducer is provided. The passive transducer provides underwater acoustic transduction based on a thermos-electric Seeback or Peltier effect contrary to the Joule heat effect used by active carbon nanotube transducers. The energy flow of the passive transducer is from acoustic to electric rather than electric to acoustic as the energy flow is for active transducers.

The structure of the transducer comprises multiple carbon nanotube layers positioned in a comparatively flexible and soft housing sealed by an edge gasket. Top and bottom shells that the edge gasket seals, are not only the protective walls of the thermal housing but also act as acoustic windows to the transducer. The shells and the edge gasket are preferably made of urethane although the shells can be of other non-conductive, soft or hard materials.

The design of the passive mode carbon nanotube transducer is significantly different than presently known thermos-acoustic or active carbon nanotube transducers in other ways. Notable is that the protective housing of the carbon nanotube transducer does not require high temperature rated materials such as Aluminum ceramic. The protective housing window or shell materials can be flexible and soft materials such as urethane or other plastic films. These types of flexible and soft materials have better acoustic impedances than the Aluminum ceramic of an active transducer or a projector housing. These materials can be used for the housing window.

Also, for the passive carbon nanotube transducer, heavy gas filling of the protective housing is not necessary. The transducer of the present invention can operate in environmental or ambient air. Furthermore, the carbon nanotube layers of the transducer can be placed directly on the nonconductive urethane shells (acoustic window plates of the protective housing) and sandwiched without a gap by the window plates.

In the housing of an active transducer, it is required that the carbon nanotube layers float between the edge gasket and the window plates because the CNT yarn will break and lose efficiency when the window plates vibrate for an active acoustic projector. The placement of the carbon nanotube layers in the passive transducer of the present invention does not require the layers to float between window plates because the transducer is passive which can sense temperature variation and converts to electric voltage. For a passive mode acoustic hydrophone, the CNT layers can stick to the window plates under the incoming acoustic waves.

A still further difference and an advantage for the passive nanotube transducer; there is no need for a high temperature rated materials. Almost all types of water tight materials such as urethane can be used to seal the transducer housing. And also, for the passive carbon nanotube transducer; the electric impedance does not need to be below 100 Ohms or be set at 50 Ohms, in order to match power amplifier output electric impedances, to which are 50 Ohms for most commercial power equipment. Instead, to match preamplifier input electric impedance, the electric impedance is preferable high (several to hundreds of kilo-Ohms) for better acoustic receiving sensitivity for the passive acoustic nanotube transducer.

BRIEF DESCRIPTION OF THE DRAWINGS

Reference is made to the accompanying drawing in which is shown an illustrative embodiment of the invention, from which its novel features and advantages will be apparent, wherein corresponding reference characters indicate corresponding parts throughout the several views of the drawings and wherein the Figure depicts a passive transducer with multi-sheet carbon nanotube material.

DETAILED DESCRIPTION OF THE INVENTION

In the Figure, a multi-sheet carbon nanotube (CNT) material assembly or passive transducer 10 of the present invention is shown. The CNT transducer 10 comprises mechanical, acoustical and electrical sections.

The mechanical section includes a first shell 12 and a second shell 14. Unlike with the assembly of an active acoustic carbon nanotube material transducer that transmits; the shells of the passive transducer 10 do not have to be high temperature rated. As such, the first shell 12 and the second shell 14 can be made of urethane, mylar or plastic with the thickness of the shells based on known durability requirements as protective housing for the carbon nanotubes and acoustic receiving capabilities of the nanotubes but not for high temperature requirements. For example: the first (top) shell 12 and the second (bottom) shell 14 can be 0.005 inches to a 0.01 inch thick urethane sheet. The thicknesses of the top shell 12 and bottom shell 14 can vary.

Materials such as urethane that can be used for the first shell 12 and the second shell 14 would have better acoustic impedances than an Aluminum ceramic material for shells used with an active carbon nanotube transducer. Furthermore, the flexibility of the material for the first shell 12 and the second shell 14 allow the shells to be used in various designs.

A sealant gasket 16 encloses the housing of the transducer 10. Unlike an active transducer, the passive carbon nanotube transducer 10 can advantageously operate in ambient or present environmental conditions and therefore does not require filling nozzles for heavy gas nor high-temperature rated materials.

Passive accumulation of data is by a first CNT sheet 20, a second CNT sheet 22 and possibly a "N" layer of CNT sheets. The number of layers "N" is determined by the carbon nanotube electrical impedance of each layer as well as the wiring in series or in parallel of each of the layers of CNT sheets. The desired final electric impedance is based on testing at the electrodes of the sheets of the transducer 10 by an impedance analyzer or simply a multi-meter. Each CNT sheet has an electrode 40 at both ends.

The top shell 12 of the transducer 10 serves as an acoustic window. The acoustic impedance (defined as the product of material density and sound speed) of the top shell 12 should match the radiation medium for higher efficiency. If the surrounding water medium has the density and sound speed of 1000 kg/m$^3$ and a sound speed of 1500 meters per second; the medium acoustic impedance is the product of the two, 1.5×10$^6$ Rayleigh.

Use of the top shell 12 and the bottom shell 14 are applicable to both acoustic and passive transducers. In the case of a passive mode CNT acoustic hydrophone; watertight protection and an ambient medium acoustic impedance match are two main factors to be considered for choice of materials, because there is no heat generated by the passive CNT acoustic hydrophone itself. In the case of an active mode CNT acoustic hydrophone; extremely high (hundreds of degrees Celsius depends on driving signal voltage and duration) temperature will be generated and accumulated during and after acoustic projection such that a high temperature rated characteristic becomes the first priority in addition to the other consideration factors of watertight protection and medium acoustic matching.

Under the Peltier-Seeback effect, thermos-electric material with free moving electrons can form electron clouds. Under a heat equilibrium state, there is no net voltage (or current) generated by the Peltier-Seeback material because the statistical number of free electrons moving from left to right statistically equals those moving from right to left that the center position of the electron cloud does not change. As such, the material is electrically natural and balanced.

The passive transducer 10 can produce underwater acoustic transduction based on the thermos-electric Seeback or Peltier effect contrary to the Joule heat effect used by active carbon nanotube transducers. The energy flow of the passive transducer would be from acoustic to electric rather than electric to acoustic as the energy flow is for active transducers. This passive acoustic-thermal transduction theory and principle can be applied to materials with Peltier-Seebeck effect by Equation (1)

$$\nabla E = -S \nabla T \tag{1}$$

where T, E, S and $\nabla$ are temperature, voltage, Seebeck coefficient and gradient respectively.

When an underwater acoustic wave impacts the carbon nanotube layers 20, 22, "N" of the transducer 10; the surrounding pressure and temperature periodically changes at the frequency of the incoming sound wave. The center of the free electron cloud of the Peltier-Seeback material also moves left to right periodically per temperature gradient. This periodic movement of the electron cloud results in a measurable alternate net electric voltage (or a current) difference that can be processed for passive acoustic or hydrophone detection.

In Peltier-Seebeck effect hydrophone applications, the electric current or voltage is proportional to the hydrophone location environmental temperature gradient (by the material Seeback coefficient "S" in Equation (1)). When the incoming underwater sound of frequency $\omega$ propagates in a liquid medium (such as water) and at the location of the transducer 10 (acting as a sensor); the surrounding environment experiences a measurable pressure disturbance.

This pressure disturbance results in temperature gradient changes of the medium at the same frequency $\omega$ as the incoming acoustic sound wave. Further, the temperature gradient is transferred into electric voltage (E) at the same frequency per the Peltier-Seebeck coefficient of the carbon nanotube material. When a current is produced, the current I=E/Z, where "Z" is the impedance of the Peltier-Seeback carbon nanotube material.

A data processor that would be used with the transducer would need a high signal to noise ratio detection for performance. If the sensor CNT impedance is high with a very low signal current; electric voltage will be a better parameter to be measured and processed.

The main advantage of the transducer 10 of the present invention is that the transducer is the first to address passive acoustic-thermal transduction theory and principles for use as an underwater transduction hydrophone. As such, the passive transducer 10 of the present invention is substantively and inventively different than active carbon nanotube transducers known in the art.

The foregoing description of the preferred embodiments of the invention has been presented for purposes of illustration and description only. It is not intended to be exhaustive or to limit the invention to the precise form disclosed; and obviously many modifications and variations are possible in light of the above teaching.

It will be understood that many additional changes in the details, dimensions, shapes, materials, steps and arrangement of parts, which have been herein described and illustrated in order to explain the nature of the invention, may be made by those skilled in the art within the principle and scope of the invention as expressed in the appended claims.

What is claimed is:

1. A transducer comprising:
   an acoustically transparent first shell in which said first shell is rectangular with a thickness between a first plane and a second plane;
   an acoustically transparent second shell in which said second shell is rectangular with a thickness between a first plane and a second plane wherein said second shell has the same rectangular size as said first shell;
   a plurality of carbon nanotube sheets with each of said carbon nanotube sheets having a first plane and a second plane such that the planes of each nanotube sheet align with the planes of said first shell and a plurality of electrodes, with at least two of said electrodes electrically connected to each of said carbon nanotube sheets with a first of said electrodes at one end of each said nanotube sheets and a second of said electrodes at another end of each of said nanotube sheets;
   and a sealant gasket having a thickness of at least one millimeter with said sealant gasket surrounding said layers of carbon nanotubes and positioned between with attachment to said first shell and said second shell to form a housing of said transducer;
   wherein said carbon nanotube sheets are capable of sensing sound induced environment temperature deviations and converting them to electric voltage by a Peltier-Seebeck effect for passive acoustic detection;
   wherein said first shell and said second shell are urethane with each of said shells having a thickness of less than one millimeter;
   wherein said first shell and said second shell are capable of being protective and having acoustic receiving capabilities for said carbon nanotube sheets.

* * * * *